United States Patent [19]

O'Donnell et al.

[11] Patent Number: 5,018,903
[45] Date of Patent: May 28, 1991

[54] PIPE CONNECTION DEVICE

[76] Inventors: Hugh W. O'Donnell, 9607 Oregano, Houston, Tex. 77036; Ahmed Ben Salah, 10823 Candlewood Dr., Houston, Tex. 77042

[21] Appl. No.: 480,805
[22] Filed: Feb. 16, 1990
[51] Int. Cl.5 .................................................. F16L 1/04
[52] U.S. Cl. .................................. 405/170; 405/158; 405/169; 166/341
[58] Field of Search ................ 405/169, 170, 191; 166/341; 414/460, 745.4, 746.5; 285/24, 27; 269/43, 37

[56] References Cited

U.S. PATENT DOCUMENTS

| 1,482,162 | 1/1924 | Streda | 269/37 X |
|---|---|---|---|
| 3,724,061 | 4/1973 | Schipper | 405/169 X |
| 3,766,743 | 10/1973 | Brown | 405/169 |
| 3,835,655 | 9/1974 | Oliver | 285/24 X |
| 4,295,527 | 10/1981 | Russe | 269/43 X |
| 4,310,263 | 1/1982 | Daughtry | 166/341 X |
| 4,436,449 | 3/1984 | Smoot et al. | 405/170 |

Primary Examiner—Dennis L. Taylor
Attorney, Agent, or Firm—Arnold, White & Durkee

[57] ABSTRACT

An apparatus and method for underwater aligning and connecting of two pipes used in directional drilling and particularly trenchless beach crossings. An alignment cable is connected between the ends of the two pipes and is tensioned to bring them into axial alignment. A rigid supporting platform is positioned on the sea floor. Securing clamps are mounted on the platform to align the two pipes. To thread the pipes, one pipe rotates about the joint axis.

6 Claims, 4 Drawing Sheets

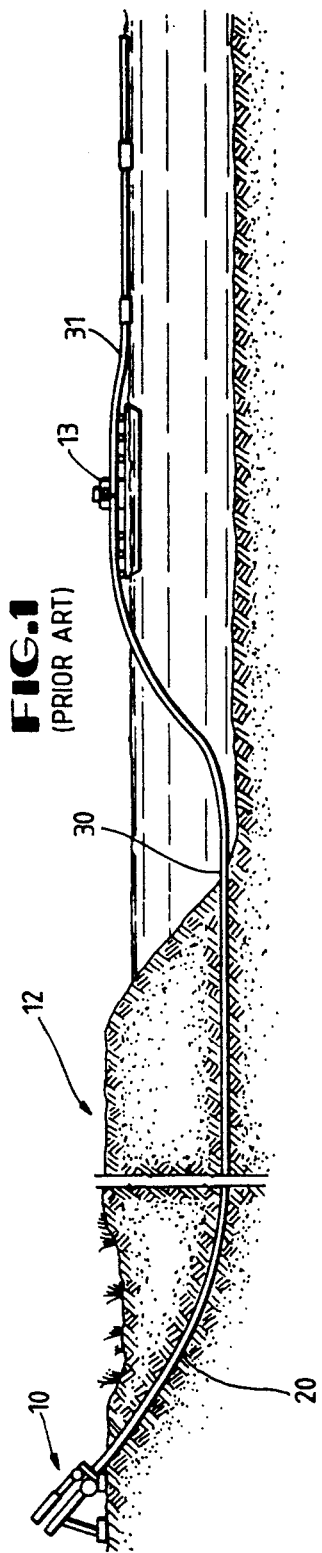
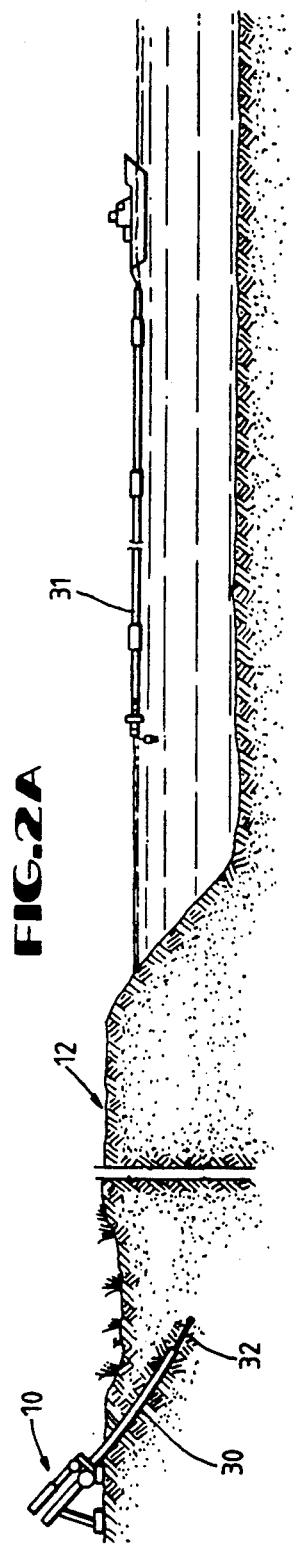
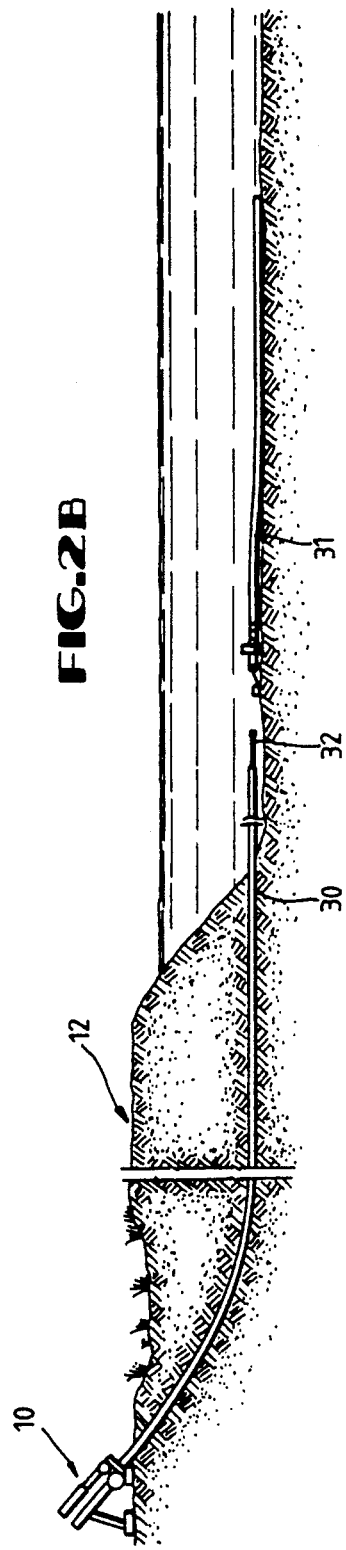

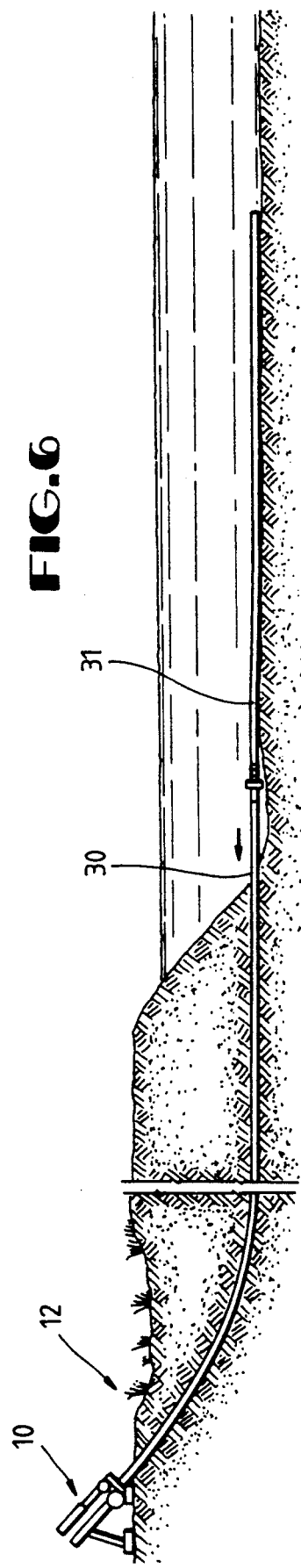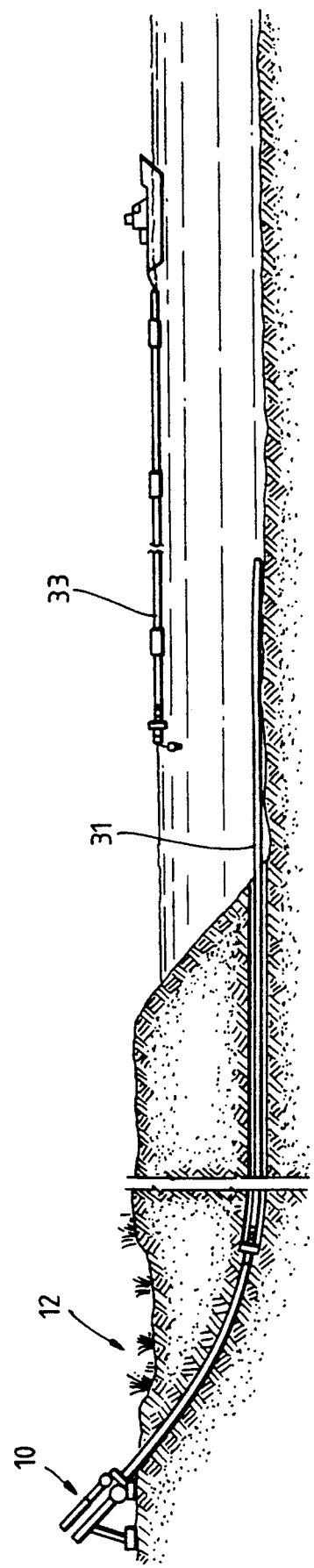

PIPE CONNECTION DEVICE

BACKGROUND OF THE INVENTION

1. Field of the Invention

The present invention relates to underwater alignment and connection of pipe in directional drilling and production applications. More particularly, the invention involves axially aligning and connecting tubular products used in trenchless beach crossings.

2. Related Art

Horizontal directional drilling is the application of drilling techniques to steer a drill along a prescribed pathway beneath an obstacle such as a river or beach. This pathway is then enlarged and improved such that a pipeline or conduit can be installed beneath the obstacle. The drill path takes a line below the surface to avoid disturbance of the banks or beach and thereby greatly reduces environmental impact. Typically, the drill path may be 30 or 40 feet beneath the surface.

Since the surface of the banks or beach are not disturbed, detrimental effects on water quality, vegetation, or wildlife are minimized. Additionally, by drilling beneath the surface of the beach, the risk of erosion is reduced or eliminated.

This invention has particular application to trenchless beach crossings. A trenchless beach crossing eliminates the need for digging a trench for laying the pipe. Typically, a drilling rig is set up behind the beach or sand dunes. From there, a hole is drilled at an angle to the surface. The hole continues horizontally below the surface of the beach (typically 30-40 feet below the surface) and exits at a remote submerged location after crossing beneath the beach.

Horizontal directional drilling is accomplished by use of a special drilling rig employing a non-rotating drill pipe with a fluid powered cutting tool at its downhole end. Direction is achieved by use of a small angular section in the body of the cutting tool, and by controlling the application of thrust on the drill string. This nonrotating pilot string drills a hole having a diameter of typically about 2⅜ inches.

During the course of the drilling a larger drill pipe called the "wash pipe," typically having a diameter of about 5 inches, is rotated over the pilot string to reduce friction between the pilot string and sides of the bore. The wash pipe has a cutter on the end, and is guided by the pilot string.

Once the pilot bit exits the bore at a submerged location on the opposite side of the beach, the 5 inch diameter wash pipe is rotated to exit at that location. The pilot string is then withdrawn from the wash pipe.

Typically, the wash pipe will extend out the bore at the submerged exit point a distance of 20-50 feet along the sea bottom. The cutter is then removed from the end of the wash pipe.

Another 5 inch diameter drill pipe referred to as the "work string" is then made up on shore, then towed offshore. The work string typically includes a swivel and a reamer for improving the well bore. This work string is connected to the wash pipe, then pulled back through the well bore.

The prior art method for connecting the wash pipe and work string involved using a barge to raise the end of the wash pipe to the surface, and connecting the work string to the wash pipe on board the barge. Typically, the ends are threaded together by rotating one end while restraining the other, with one pipe having a pin end connection and the other pipe having a box end connection. A swivel and reamer typically are connected between the wash pipe and the work string.

Then the connection is lowered to the sea bottom, and the wash pipe and reamer are rotated as the work string is pulled back through the bore. The wash pipe is removed from the hole joint by joint until the reamer reaches the foot of the drilling rig.

A pipeline is then either prepared offshore or onshore and towed offshore to be connected to the work string. The end of the work string and the pipeline are then raised to the surface to connect them together. As before, one pipe has a box end connection and one has a pin end connection. A swivel and "bullet nose" reamer typically are connected between the work string and the pipeline to further improve and assist the pipeline into the bore.

After the pipeline is connected to the work string, it is lowered to the sea bottom and the work string, bullet nose and pipeline are pulled back through the well bore. The work string is removed from the hole joint by joint until the bullet nose reaches the foot of the drill rig. The pipeline is then safely in place below the beach.

One problem that has been encountered with the prior art method is the time and expense for use of a barge at an offshore location. Also, underwater connection has not been practical because the pipes are often misaligned on the sea bottom and have no means of restraint to facilitate threading them together.

SUMMARY OF THE INVENTION

The present invention overcomes the above mentioned problems and disadvantages by providing an apparatus and method for axially aligning and connecting the pipes at an underwater location. The present invention eliminates the need for raising pipes to the surface with an offshore barge. Instead, the pipes may be aligned and connected underwater by divers. The apparatus and method is intended for use in horizontal directional drilling, and is particularly well suited for underwater connection of pipes used in beach crossings.

One end of the first pipe string exits the bore horizontally at a remote subsea location, and a second pipe string is towed to near that subsea location and laid on the sea bottom. An alignment cable interconnects the first pipe string and the second pipe string such that when one of the pipes is moved axially by pulling with the drill rig, the alignment cable is tensioned to axially align each of the two pipes.

A rigid platform is then lowered and positioned on the sea floor. The platform includes securing means or clamps positioned in substantial alignment with each pipe axis. The clamps are designed so that the first pipe is allowed to rotate about the axis, while the second pipe may be secured so that the two may be threaded together. The platform provides a solid base to resist rotation of the second pipe.

BRIEF DESCRIPTION OF THE DRAWINGS

FIG. 1 is a side view of the prior art used for connecting pipe in trenchless beach crossings.

FIG. 2A is a side view of a trenchless beach crossing, showing a work string towed out before connection with the wash pipe.

FIG. 2B is a side view of a wash pipe and submerged work string before alignment and connection.

FIG. 6 is a side view of a connected wash pipe and work string used in a trenchless beach crossing.

FIG. 7 is a side view of a trenchless beach crossing, showing a pipeline towed out before connection with the work string.

DETAILED DESCRIPTION OF THE PREFERRED EMBODIMENT

Figure 3A:
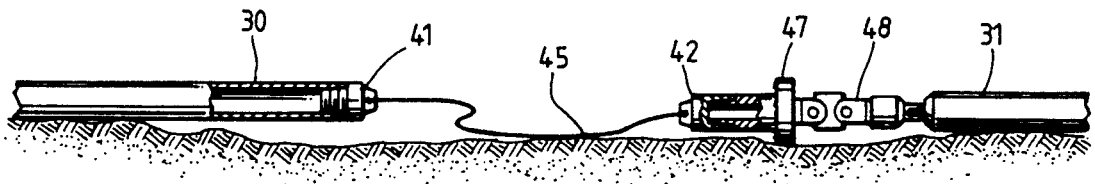
FIG. 3A is a side view, partially in section, of the alignment device including the alignment cable.

As shown in FIG. 1 (prior art), a drilling rig 10 is typically set up behind the sand dunes 12. From there, the bore 20 is drilled at an angle underneath the beach. The wash pipe 30 exits the bore at a submerged location. Also shown in FIG. 1 is the work string 31. According to the prior art, a floating barge 13 is positioned offshore at a position adjacent the exit of the bore. The barge is used to lift the wash pipe 30 for threaded connection with the work string 31.

FIG. 2A is a section view of a trenchless beach crossing showing the pilot string 32 and wash pipe 30. As can be seen in FIG. 2B the wash pipe exits the bore at a submerged location. Also shown is a submerged work string 31 prior to connection with the wash pipe.

Figure 3B:
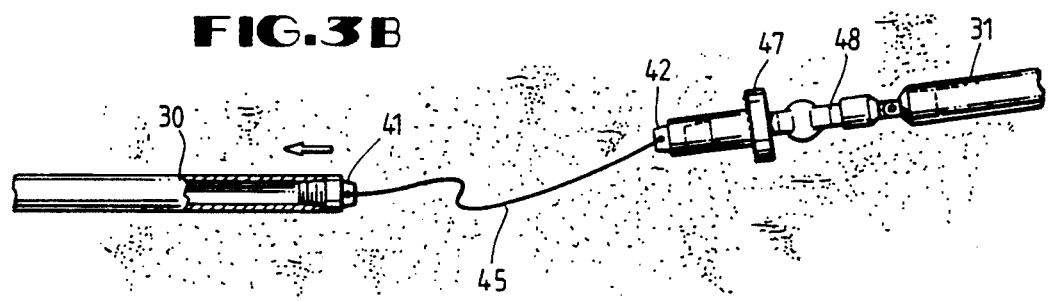
FIG. 3B is a top view of the alignment device including the alignment cable.
Figure 3C:
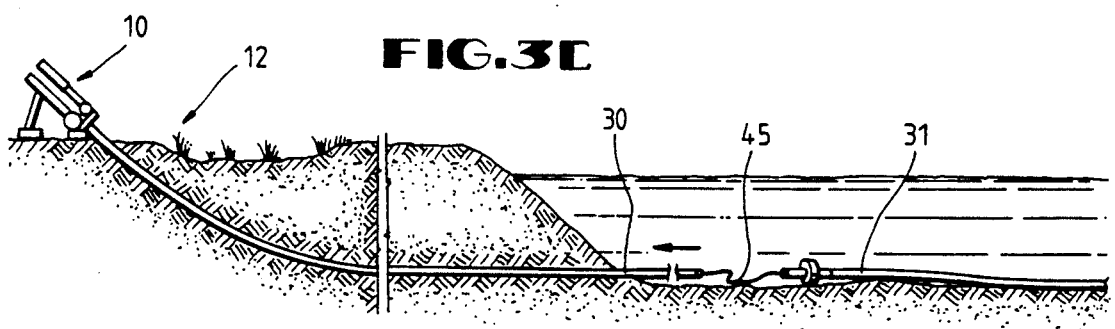
FIG. 3C is a side view of the alignment device including the alignment cable used in a trenchless beach crossing.
Figure 4:
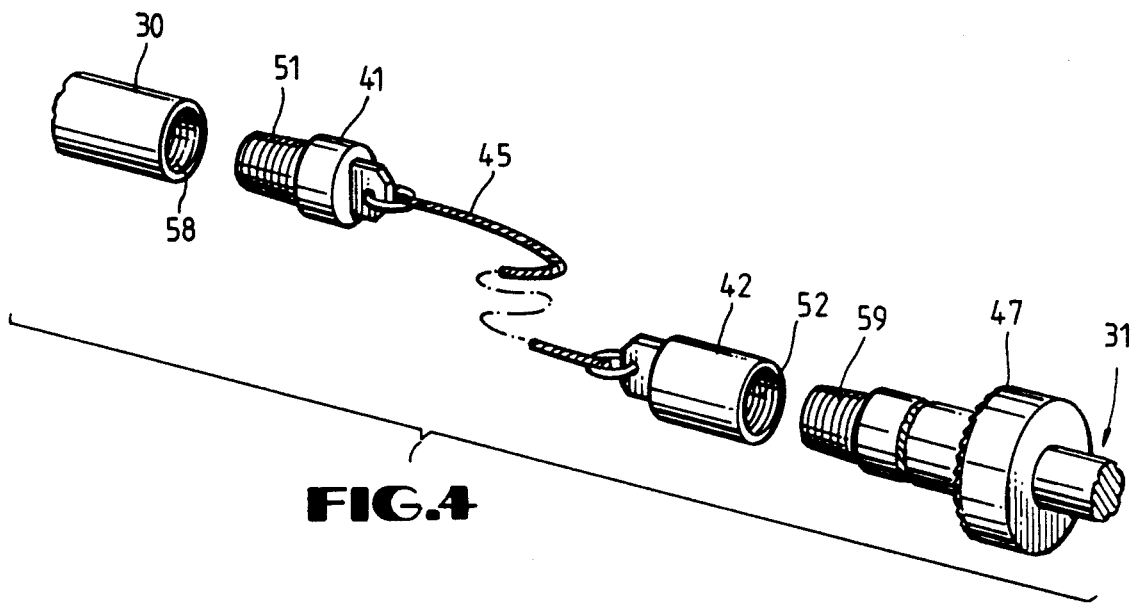
FIG. 4 is a perspective view of the alignment device including the alignment cable.

FIG. 3A shows end pieces 41 and 42 threaded to the respective ends of the wash pipe 30 and work string 31. As shown in FIG. 3B and FIG. 4, the end piece 41 for the wash pipe has a threaded pin end 51 and the end piece 42 for the work string has a threaded box end connection 52. An alignment cable 45 is connected between the end pieces 41 and 42. Also shown in FIGS. 3A and 3B is the reamer 47 and swivel 48 connected to the work string 31. FIG. 3C shows the work string, wash pipe and alignment cable 45 used in a trenchless beach crossing.

Figure 3D:
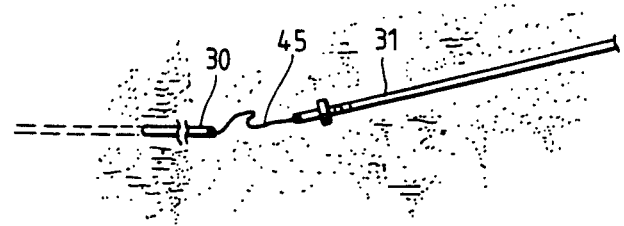
FIG. 3D is a top view of two pipes prior to alignment.
Figure 3E:
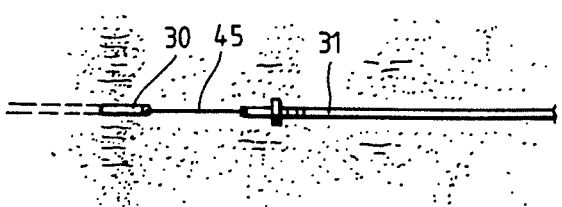
FIG. 3E is a top view of two pipes after alignment with the present invention.

FIG. 3D shows the work string 31 and wash pipe 30 from a top view, in misalignment, prior to tensioning the alignment cable. FIG. 3E shows the work string and wash pipe aligned after tensioning the alignment cable 45.

After the alignment cable 45 is connected, the wash pipe 30 is partially withdrawn into the bore as shown in FIG. 6. This takes up the slack in the alignment cable. By tensioning the alignment cable 45, the wash pipe 30 and work string 31 are axially aligned so that the pipes may be threaded together. The alignment cable 45 and end pieces 41 and 42 are then disconnected from the pipe ends. As shown in FIG. 4, the wash pipe 30 has a box end connection 58, and the work string 31 has a pin end connection 59 that are then threaded together.

Figure 5:
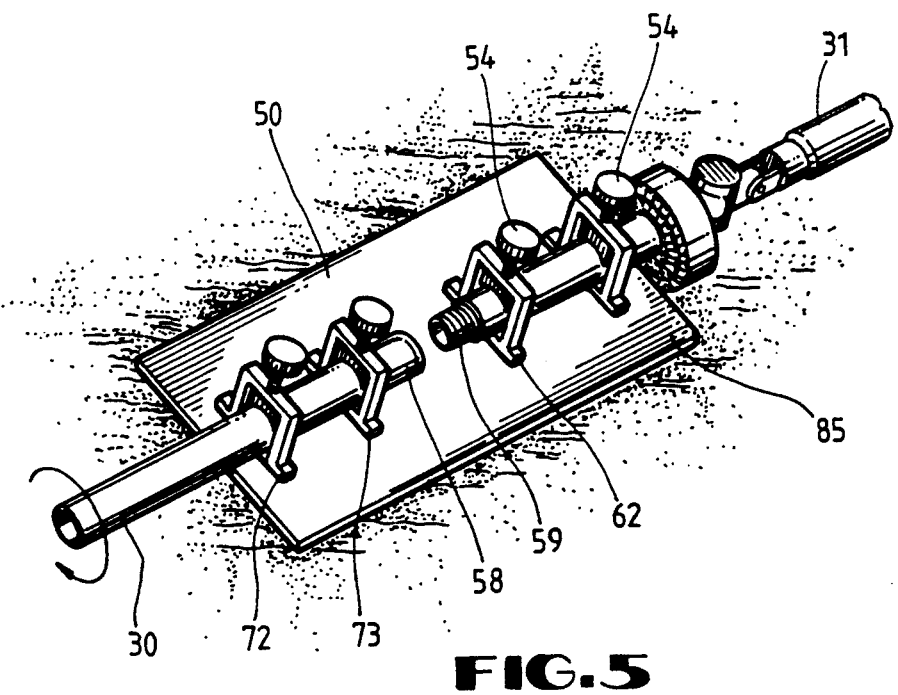
FIG. 5 is a top view of the connection device.

FIG. 5 shows the pipe connection device. A rigid supporting member (or platform) 50 is positioned on the sea bottom such that it will resist rotation about the axis of the connection. The platform 50 is of sufficient dimensions so that the torque of rotation of the connection will not cause rotation of the platform during threading of the two pipes. Cable or other means (not shown) are connected to couplings 85 on the platform and may be used to raise and lower the platform.

To position the platform 50 under the two pipe ends, the pipe ends are lifted up with inflatable devices such as parachutes or other means as is well known in the art. Since there is a gap between the wash pipe and work string, the wash pipe 30 is then pushed back to abut with the work string for threading. The platform 50 supports one or more retractable clamps 62, 63 positioned to grip the work string 31 and prevent rotation of the work string about the axis of the connection. The clamps 62, 63 include tightening means 54 to securely clamp the pipe. For the wash pipe 30, the clamps 72, 73 are designed to allow rotation of the pipe as the connection is threaded together. All of the clamps 62, 63, 72, 73 are in substantial alignment. The wash pipe 30 is then rotated from the drill rig so that the pin 59 and box 58 connections are threaded together. After threading the connection, the clamps 62, 63, 72 and 73 disconnect the pipes and the platform 50 is raised to the surface.

As shown in FIG. 6, the work string 31 is pulled into the bore. Then, as shown in FIG. 7, a pipeline 33 is towed offshore and must be connected to the work string 31. The alignment cable 45 and platform 50 are again used and the same steps are repeated.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An apparatus for the underwater threading together of the threaded ends of first and second interconnectable tubular products for directional drilling and production applications, the joint having a horizontal axis on the sea bottom, comprising:
    (a) a rigid supporting member positionable on and retrievable from the sea bottom, the supporting member dimensioned to resist rotation about the joint axis during threading together of the threaded ends;
    (b) first securing means mounted to the supporting member for securing the first tubular product, the first securing means adapted to allow rotation of the first tubular product about the joint axis; and
    (c) second securing means mounted to the supporting member for securing the second tubular product in substantial axial alignment with the first tubular product, the second securing means adapted to resist rotation of the second tubular product about the joint axis.

2. The apparatus of claim 1, further comprising means for raising and lowering the rigid supporting member.

3. The apparatus of claim 1 wherein the first securing means comprises a plurality of retractable clamping members to allow rotation of the first tubular product and the second securing means comprises a plurality of retractable clamping members positioned to resist rotation of the second tubular product.

4. An apparatus for underwater threading together of the ends of a first and second pipes on a horizontal axis each pipe having first and second threaded ends, the first end of the first pipe exiting a directionally drilled bore at a submerged location, and the second end of the second pipe being positionable near the submerged location, comprising a platform retrievably positionable at the submerged location and dimensioned to resist rotation during threading the pipe ends together; first clamp means and second clamp means mounted on the platform in substantial axial alignment, the first clamp means adapted to allow rotation of the first pipe about the longitudinal axis and the second clamp means adapted to resist rotation of the second pipe when the first pipe is rotated about the longitudinal axis.

5. The apparatus of claim 4 wherein the clamp means are pipe clamps.

6. A method fore threading together the ends of a first pipe horizontally exiting a bore hole and a second pipe adjacent the bore hole at a submerged location, comprising the steps of:

(a) axially aligning the first and second pipe ends;

(b) positioning a platform at the submerged location, the platform adapted to resist rotation about the longitudinal axis of the connection;

(c) securing the first pipe end to the platform, such that the first pipe can rotate about the longitudinal axis;

(d) securing the second pipe end to the platform in substantial alignment with the first pipe end such that the second pipe end is resistant to rotation about the longitudinal axis;

(e) rotating the first pipe end about the longitudinal axis to thread it to the second pipe end; and (f) retrieving the platform from the submerged location.

* * * * *

UNITED STATES PATENT AND TRADEMARK OFFICE
CERTIFICATE OF CORRECTION

PATENT NO. : 5,018,903
DATED : May 28, 1991
INVENTOR(S) : Hugh W. O'Donnell and Ahmed Ben Salah It is certified that error appears in the above-identified patent and that said Letters Patent is hereby corrected as shown below:

Column 4, line 58, delete "product" and insert --product,--.

Column 4, line 63, delete "of a first" and insert --of first--.

Column 4, line 63, delete "axis" and insert --axis,--.

Column 5, line 11, delete "fore" and insert --for--.

Signed and Sealed this

Sixteenth Day of February, 1993

Attest:

STEPHEN G. KUNIN

Attesting Officer

Acting Commissioner of Patents and Trademarks